United States Patent Office 2,866,248
Patented Dec. 30, 1958

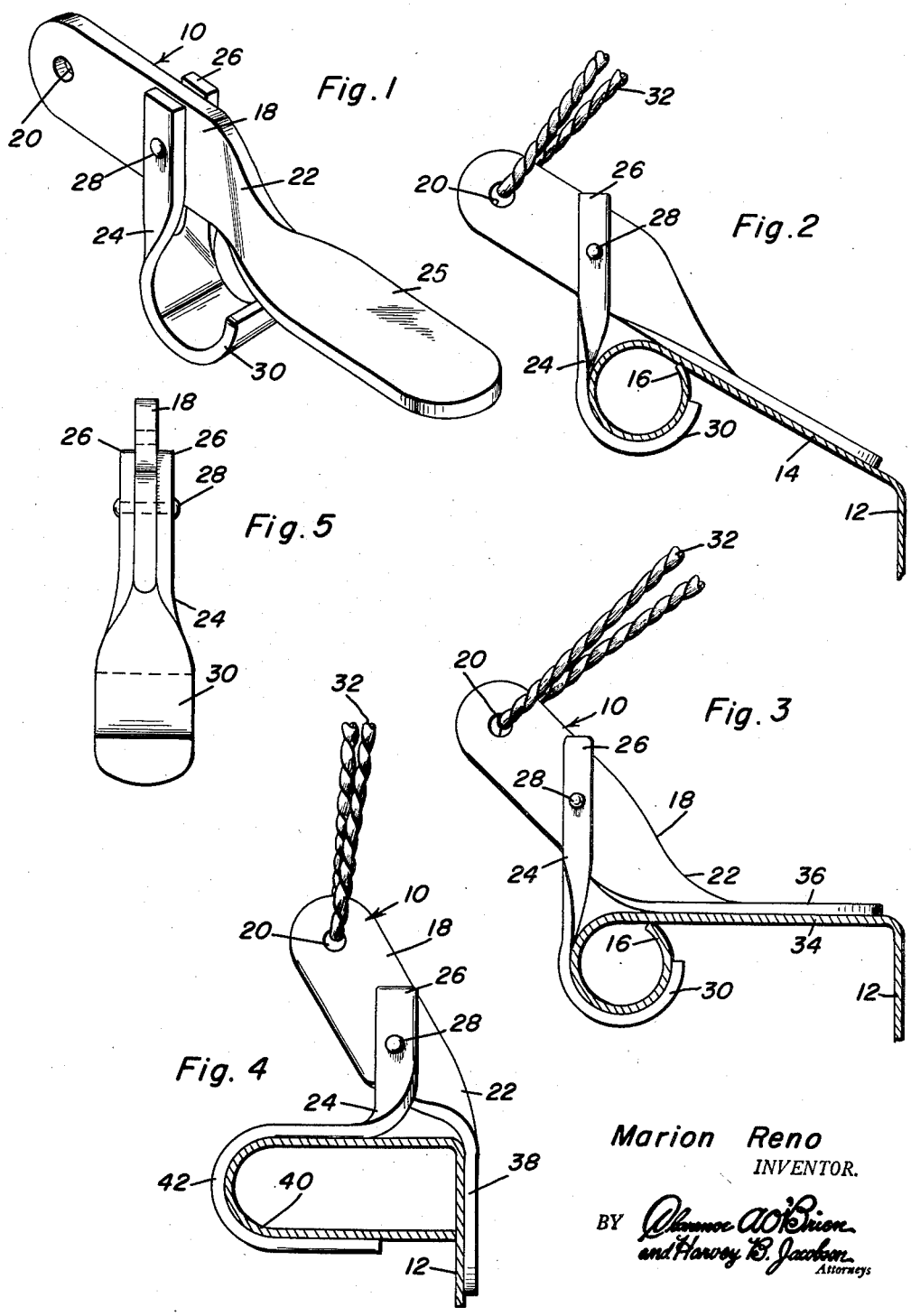

2,866,248

TIE-DOWN CLAMP FOR PICK UP TRUCKS

Marion Reno, San Bernardino, Calif.

Application April 8, 1954, Serial No. 421,758

1 Claim. (Cl. 24—248)

This invention relates to a tie-down clamp for pick up trucks and more specifically provides an easily and quickly attachable clamp device for securing a tie-down line to the usual flanges found alongside and at the upper edge of a conventional pick up truck body.

An object of this invention is to provide a tie-down clamp for pick up trucks which is simple in construction, easy to attach and detach, positive in action, secure, well adapted for its purposes and relatively inexpensive to manufacture.

Another object of this invention is to provide a tie-down clamp for use in conjunction with pick up truck bodies and including a hooked end portion pivotally secured to an abutment member wherein the hooked end portion is adapted to engage under the usual circular flange on the pick up truck body in opposition to the abutment member thereby efficiently and effectively providing a support for a hold-down line either for securing a load or a cover such as a tarpaulin or the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the tie-down clamp of the present invention;

Figure 2 is a side view of the construction of Figure 1 showing the device in use on the upper sides of a pick up truck body;

Figure 3 is a side elevation similar to Figure 3 showing a modified form of the tie-down clamp of the present invention for use on another type of pick up truck body;

Figure 4 is a side elevational view similar to Figures 2 and 3 showing another modified form of the tie-down clamp for use on another type of pick up truck body; and Figure 5 is an end view of the construction of the tie-down clamp of the present invention.

Referring now specifically to the drawings, it will be seen that the numeral 10 generally indicates the tie-down clamp of the present invention as illustrated in Figures 1 and 2 especially for use in conjunction with a pick up truck body 12 having an upwardly and outwardly extending flange 14 at its upper edge which terminates in a circular member or underlying tubular bead 16. The tie-down clamp 10 includes an elongated twisted and bent plate member or bar 18 having a vertically disposed lever portion with an aperture 20 in one end thereof. A right angular twist 22 is provided substantially at the mid-portion of the plate 18 thereby providing a flat extending portion or jaw 25 for engaging the upper surface of the flange 14 of a pick up truck body 12. A hook member 24 having a pair of spaced attaching arms or furcations 26 is pivotally secured to the vertical portion of the elongated strap 18 by a suitable pivot pin 28 adjacent the right angular twist portion 22 and the lower end of the hook member 24 terminates in a jaw or bill 30 for engaging under the circular portion 16 of the flange 14. It will be seen that the flat portion 25 of the elongated plate member 18 engages the upper surface of the flange 14 and the hook-bill 30 engages the circular portion 16 wherein a tie-down line 32 may be positioned in the aperture 20 and the pressure on the tie-down line 32 will securely fasten the tie-down clamp 10 to the pick up truck body 12 in an obvious manner.

Referring now specifically to Figure 3, it will be seen that the pick up truck body 12 is provided with a horizontally extending flange 34 terminating in a circular member 16 and the right angular twist portion 22 of the strap 18 is also right angularly bent thereby forming an extending portion 36 which is in a different plane from the remainder of the elongated plate member 18. The tie-down line 32 operates in the same manner for binding the tie-down clamp 10 to the pick up truck body 12, wherein the extending portion 36 engages flatly against the upper surface of the horizontal flange 34.

Referring now specifically to Figure 4, it will be seen that the right angular twisted portion 22 of the elongated plate member 18 is bent in an opposite direction from the device of Figure 3 thereby forming a flat strap 38 for engaging the vertical side wall of the pick up truck body 12 which terminates in an elongated loop member 40 and it will be seen that the hook member 24 terminates in an elongated and enlarged hook bill 42 for engaging around a portion of the elongated loop 40 thereby securing the tie-down clamp to the pick up truck body 12 in the usual manner. Further, it will be understood that the device may be modified in order to fit and be secured to various types of pick up bodies having various shaped flanges and in order to be securely positioned on such pick up truck bodies. Obviously, the device may be constructed of any readily obtainable material satisfying the necessary strength requirements and the device may be utilized for holding down a load in a pick up truck, holding a canvas or other suitable cover, and any other suitable uses.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A clamp for connecting a tie-down line to a pick-up truck body of the type including a vertical side wall comprising a lateral top flange of substantially U-shaped transverse section, said clamp comprising: a flat metallic bar twisted and bent at an intermediate point, one end portion of said bar forming a lever having an opening in its free end portion for connecting the line thereto, and a substantially U-shaped horizontal hook pivotally suspended from the lever for the reception of the flange, the other end portion of said bar being angled toward the hook and extending downwardly well beyond said hook in spaced, opposed relation thereto and constituting a flat jaw for face-abutting engagement with the side wall and cooperable with the hook for anchoring the clamp to the body.

References Cited in the file of this patent

UNITED STATES PATENTS

| 1,512,003 | McGeary | Oct. 14, 1924 |
| 1,888,083 | Holtz | Nov. 15, 1932 |
| 2,280,430 | Glynn | Apr. 21, 1942 |
| 2,324,361 | Chandler | July 13, 1943 |
| 2,344,644 | Schwan | Mar. 21, 1944 |
| 2,509,484 | Curley | May 30, 1950 |
| 2,590,218 | Steil | Mar. 25, 1952 |

FOREIGN PATENTS

| 8,261 | Great Britain | Apr. 6, 1910 |